(12) United States Patent
Levy et al.

(10) Patent No.: US 7,949,183 B2
(45) Date of Patent: May 24, 2011

(54) METHODS AND APPARATUS FOR ENHANCING COLOR DATA

(75) Inventors: Avi Levy, Kiryat Tivon (IL); Joseph Levitas, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 11/717,264

(22) Filed: Mar. 13, 2007

(65) Prior Publication Data

US 2008/0226163 A1 Sep. 18, 2008

(51) Int. Cl.
*G06K 9/00* (2006.01)

(52) U.S. Cl. ........................................ 382/167

(58) Field of Classification Search .......................... None
See application file for complete search history.

(56) References Cited

U.S. PATENT DOCUMENTS

| | | | | |
|---|---|---|---|---|
| 4,636,839 A * | 1/1987 | Cole et al. | | 348/578 |
| 5,412,433 A * | 5/1995 | Holland et al. | | 348/650 |
| 5,867,169 A * | 2/1999 | Prater | | 345/604 |
| 6,515,700 B2 * | 2/2003 | Nakamura et al. | | 348/256 |
| 6,816,610 B1 * | 11/2004 | Beckwith | | 382/162 |
| 7,015,962 B2 | 3/2006 | Acharya | | 348/273 |
| 7,126,610 B2 * | 10/2006 | Hammond | | 345/589 |
| 7,403,653 B2 * | 7/2008 | Hirashima et al. | | 382/167 |
| 7,583,838 B2 * | 9/2009 | Lee | | 382/167 |
| 2003/0214520 A1 * | 11/2003 | Throup et al. | | 345/690 |
| 2004/0013298 A1 * | 1/2004 | Choe et al. | | 382/167 |
| 2004/0165771 A1 * | 8/2004 | Russell et al. | | 382/167 |
| 2004/0239814 A1 * | 12/2004 | Hirashima et al. | | 348/649 |
| 2005/0185839 A1 * | 8/2005 | Matsubara | | 382/167 |
| 2006/0001928 A1 * | 1/2006 | Hayaishi | | 358/518 |

* cited by examiner

*Primary Examiner* — Yuzhen Ge

(74) *Attorney, Agent, or Firm* — Trop, Pruner & Hu, P.C.

(57) ABSTRACT

In one embodiment, an image processor may be used to manipulate a hue value to obtain an updated hue value, manipulate a saturation value to obtain an updated saturation value based on the updated hue value and the saturation value, and if updated pixel data including the updated hue value and the updated saturation value is an illegal value, adjust a luma value. Other embodiments are described and claimed.

13 Claims, 4 Drawing Sheets

… (US 7,949,183 B2)

METHODS AND APPARATUS FOR ENHANCING COLOR DATA

BACKGROUND

Embodiments relate to processing of data, and more particularly to processing of image or video data.

Today, various applications exist that use digital processing of image or video data. Examples are widespread, including digital video applications such as digital video recording, digital processing of video data, e.g., via signals received such as high definition television (HDTV) signals, digital versatile disc (DVD) information and so forth. Similarly, digital processing of data obtained from a digital imaging device such as a digital camera or so forth is common.

Such data is received in a particular color space, such as a Red, Green, Blue (RGB), Luminance/Chrominance YUV or YCrCb, LSH (Luminance, Saturation, Hue) or any other color space. In processing this data, information in a given color space may be converted into another color space for further processing and later storage or output to a display device. While various color conversions exist, it sometimes could be difficult and time consuming to perform enhancements on the converted data.

DETAILED DESCRIPTION

In various embodiments, a so-called total color control (TCC) algorithm may be used to perform saturation enhancement and hue manipulation for still images and video sequences. The color manipulations are performed in the luma, saturation and hue (LSH) color space. The usage of this color space allows flexible and independent control over the H and S color space components. The algorithm performs pixel-wise hue manipulation and saturation enhancement based on predefined functions. In some embodiments, the luma component is changed only when the enhanced color components constitute an illegal LSH value. As described below, an illegal LSH value means that when these coordinates are transformed to the original color space, the resulting values reside outside the RGB color cube.

Figure 1:
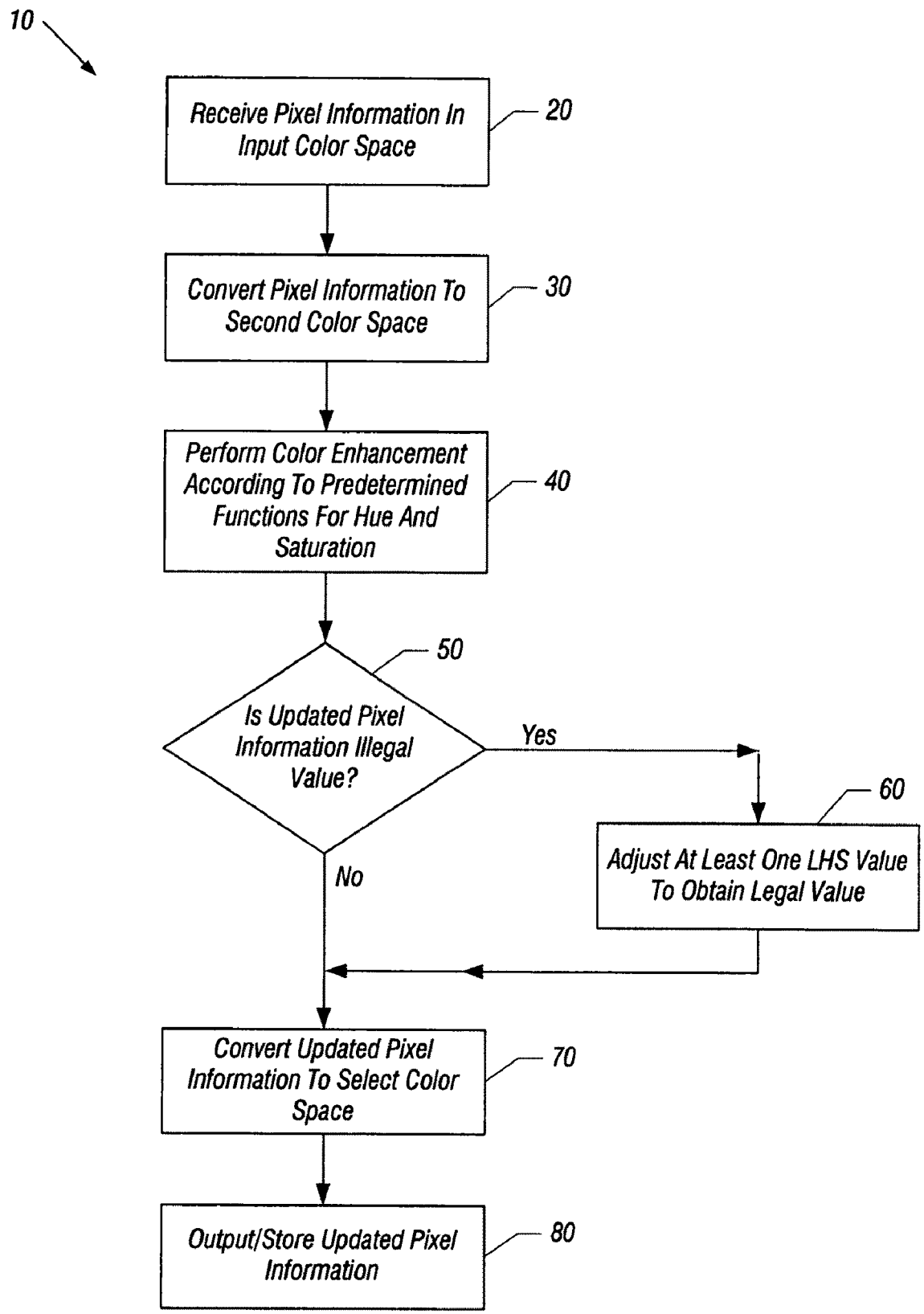
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may begin by receiving pixel information in an input color space (block 20). For example, incoming pixel data, e.g., received from a digital video source which may be a digital still camera or so forth may be received by an image processor. This pixel information may be received in a first color space, e.g., the RGB color space or any other color space. Next, method 10 may convert the pixel information to a second color space (block 30). For example, if the input data is not in the LSH space, the conversion to the LSH color space is performed.

Referring still to FIG. 1, color enhancement then may be performed on the pixel information (block 40). More specifically, the color enhancement may be performed according to predetermined functions for the hue and saturation values of the pixel information. As will be described further below, in various embodiments different predetermined functions may be used to obtain updated pixel information.

Still referring to FIG. 1, after performing the color enhancement to obtain updated or enhanced values for hue and saturation, it may be determined whether the updated pixel information constitutes an illegal value (diamond 50). That is, it may be determined whether the updated pixel value is an illegal color value. If so, control passes to block 60. At block 60, at least one LHS value may be adjusted to obtain a legal value for the pixel information. As will be described further below, in one embodiment only a luma value may be adjusted to obtain the legal value.

Referring still to FIG. 1, from both diamond 50 and block 60, control may pass to block 70, where the updated pixel information may be converted to a selected color space, such as back to the input, or any other, color space. Finally, the updated pixel information may be stored, e.g., in a location in a frame buffer or other storage corresponding to the pixel location within an image (block 80). Furthermore, the updated pixel information may be output, e.g., to a display, printer or other output source. In this way, enhanced color values may be obtained. Such enhanced color values may provide for more desirable coloring of an image, allowing fuller colors while retaining the clarity of the original image.

Thus, in one embodiment, the TCC algorithm receives a still image (or a video frame) in a standard color format, and then transforms each pixel to the LSH format prior to performing color enhancement according to three pre-defined functions:

$$H_{new} = F_H(L, S, H) \quad (1)$$

$$S_{new} = F_S(L, S, H_{new}) \quad (2)$$

$$L_{new} = F_L(L, S_{new}, H_{new}) \quad (3)$$

In other words, each of the enhanced values is a function with respect to either original or updated L, S, and H values. At the end of the enhancement stage, the algorithm transforms the pixel coordinates back to the original input, or any other, color space.

The hue manipulation function in EQ. 1 is defined in its most general form. However, for efficient implementation the following reduced form may be used.

$$H_{new} = H + \Delta H(S, H) \quad (4)$$

where, $$\Delta H(S, H) = \Delta H_H(H) \Delta H_S(S) \quad (5)$$

Figure 2A:
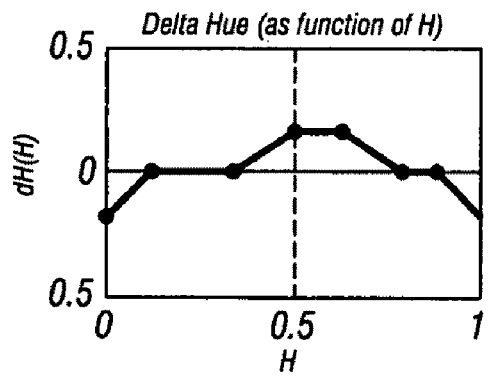
FIG. 2A is a graphical representation of a first hue function in accordance with one embodiment.
Figure 2B:
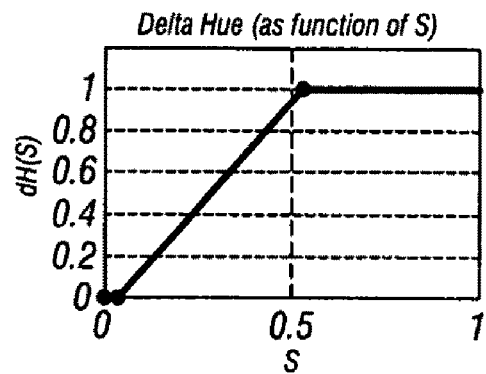
FIG. 2B is a graphical representation of a second hue function in accordance with one embodiment.

FIGS. 2A and 2B present an example of $\Delta H_H(H)$ and $\Delta H_S(S)$ in one embodiment. Thus the new H value may correspond to the delta values, e.g., obtained from FIGS. 2A and 2B multiplied together, and thus the updated hue value $H_{new} = H_{new}(H, S)$.

The saturation enhancement function in EQ. 2 may also be implemented in a reduced form:

$$S_{new}(L, S, H) = S_{new}(\alpha(H_{new}, L), S) \quad (6)$$

where alpha (α) is a parameter which controls an amount of saturation increase/decrease:

$$\alpha(H_{new}, L) = \alpha_H(H_{new})\alpha_L(L) \quad (7)$$

Figure 2C:
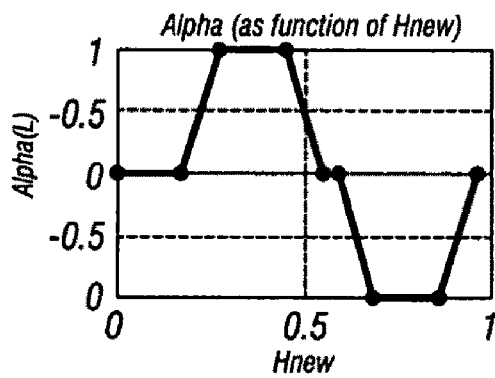
FIG. 2C is a graphical representation of a first alpha function in accordance with one embodiment.
Figure 2D:
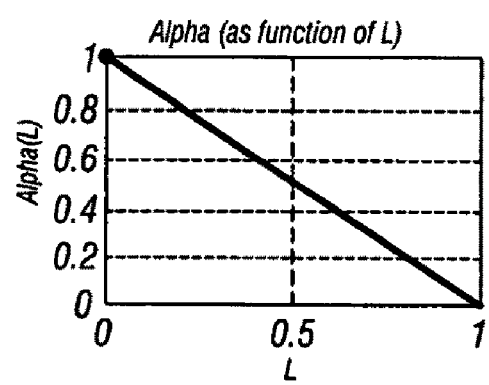
FIG. 2D is a graphical representation of a second alpha function in accordance with one embodiment.
Figure 2E:
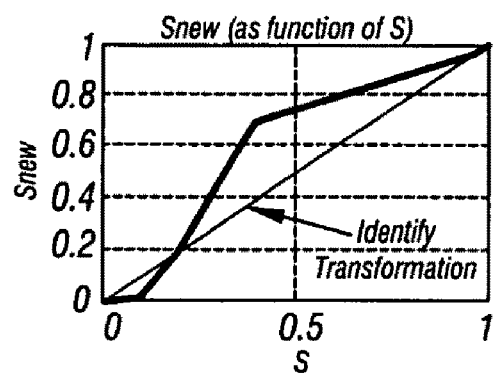
FIG. 2E is a graphical representation of a saturation function in accordance with one embodiment.

An example of the $\alpha_H(H)$ and $\alpha_L(L)$ definitions is given at FIGS. 2C and 2D, respectively, and the function $S_{new}(\alpha, S)$ is shown at FIG. 2E. The parameter α defines the slope of the S to $S_{new}$ transformation, such as shown in FIG. 2E. Note that the functions shown in FIGS. 2A-2E are examples of a much wider class of functions which could be used accordingly by simply providing a different parameter set.

Figure 3:
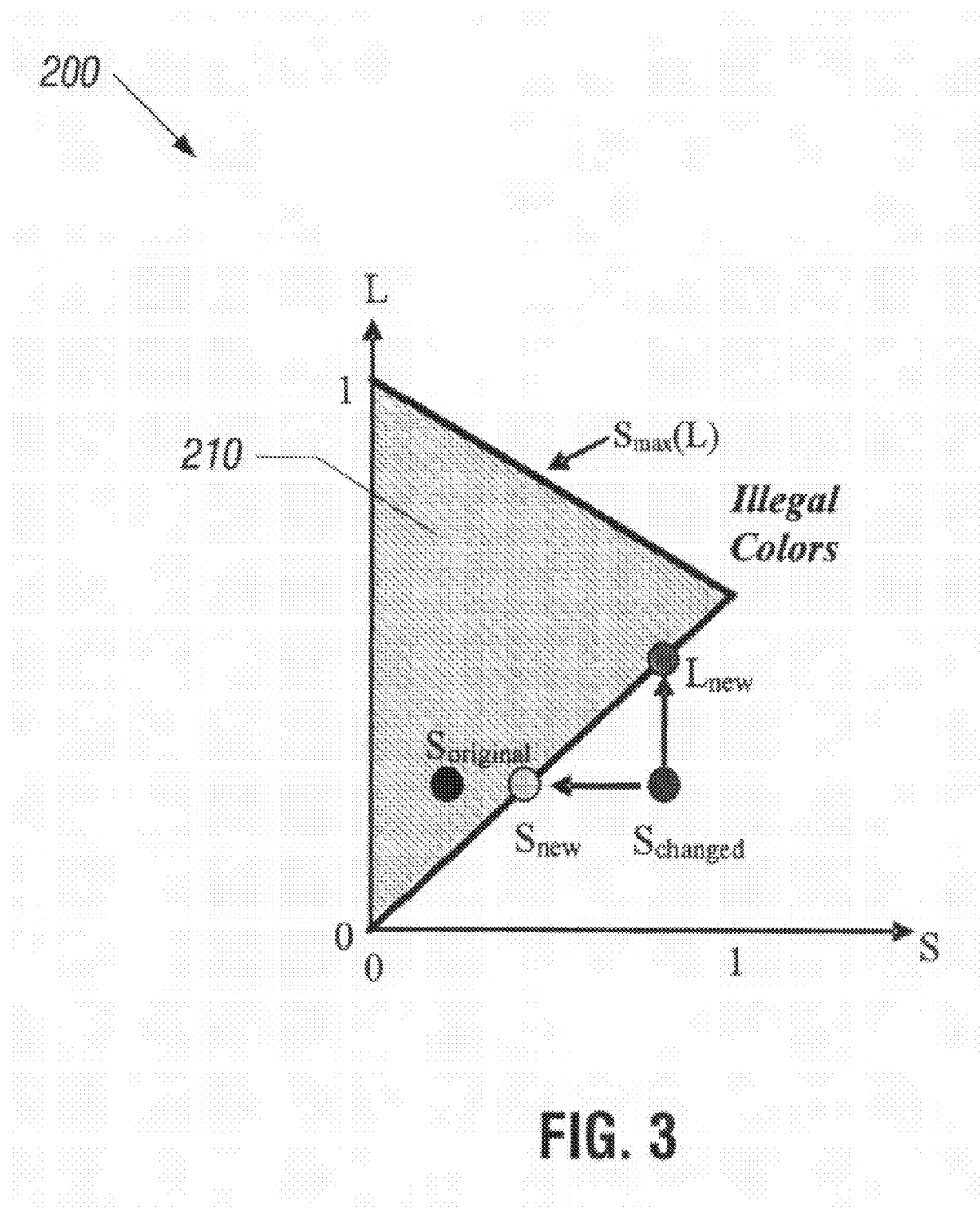
FIG. 3 is a graphical representation of a luma correction in accordance with one embodiment.

The new hue and saturation values with the original luma value may constitute an illegal pixel value if their transform to RGB leads to a value outside the RGB cube. A correction procedure such as clipping in the RGB color space may result in color artifacts. Therefore, a luma correction step may be appended to the H and S enhancement stages, in such a way that the hue component of the pixel is preserved and only the luma component is changed. FIG. 3 demonstrates a luma correction procedure in accordance with one embodiment of the present invention. Specifically, FIG. 3 shows a subspace 200 (L, S) of the LSH space for a constant hue. The triangular striped region 210 is a collection of all points having a legitimate saturation value. The edge of region 210 represents the maximal legitimate saturation, $S_{max} = S_{max}(L,H)$. The original S value ($S_{original}$) is changed by the TCC algorithm to the $S_{changed}$ value. For the pixel value to be in the legal domain the saturation could be reduced to $S_{new}$, keeping the L value unchanged. However, this procedure limits the amount of saturation enhancement. Instead, in certain embodiments the saturation value may be kept unchanged and the luma value corrected to $L_{new}$. Thus using the TCC algorithm in this example, an original saturation value is updated, and a corrected luma value is used to obtain a legal pixel value.

Figure 4:
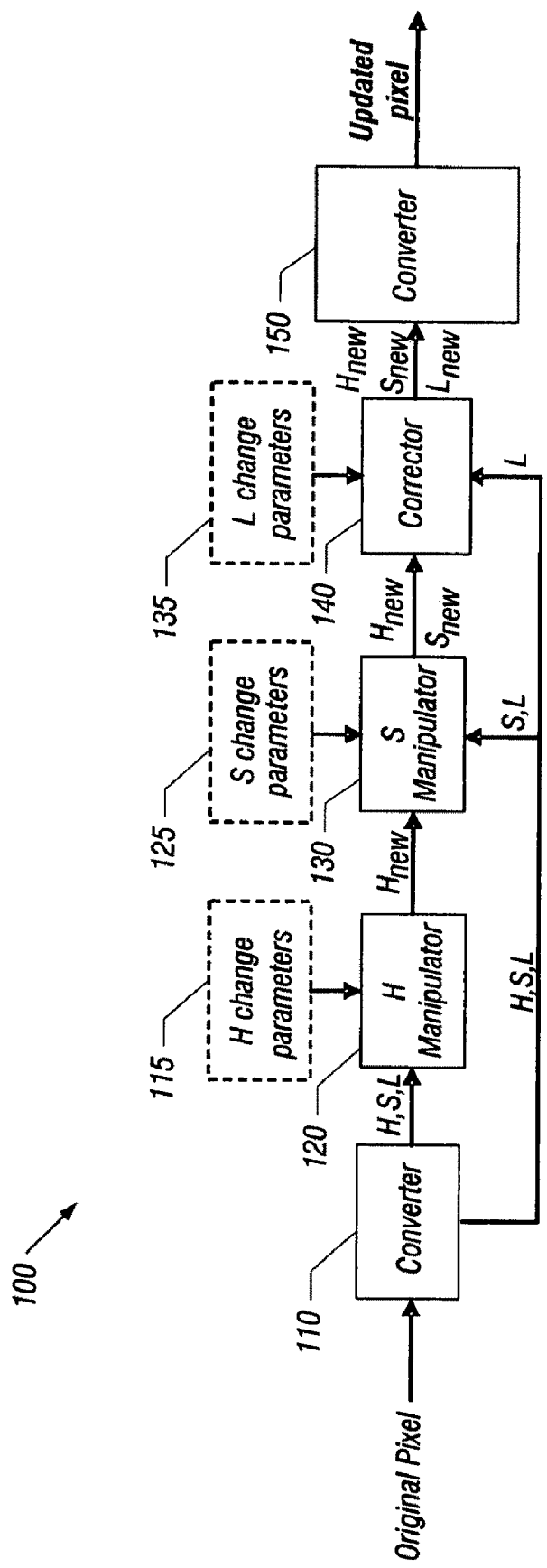
FIG. 4 is a block diagram of an image processor in accordance with an embodiment of the present invention.

Referring now to FIG. 4, shown is a block diagram of an image processor in accordance with an embodiment of the present invention. As shown in FIG. 4, image processor 100 may receive incoming data, i.e., incoming original pixel data and perform various manipulations to enhance the color information and output the enhanced color information. As shown in FIG. 4, image processor 100 includes a converter 110 that is coupled to receive incoming pixel data. Such pixel information may be in one of various color spaces such as the RGB color space or the YCbCr, for example. Converter 110 may convert the pixel information to the LSH color space. The resulting LSH values may be provided to a hue manipulator 120. Hue manipulator 120 may further be coupled to receive hue change parameters 115, e.g., from a non-volatile storage or other source. Hue manipulator 120 may generate an updated hue value, i.e., $H_{new}$, based on the received hue and saturation values, as well as hue change parameters 115. Accordingly, hue manipulator 120 may output an updated hue value to a saturation manipulator 130.

As shown in FIG. 4, saturation manipulator 130 may further be coupled to receive the original saturation and luma values. Furthermore, saturation manipulator 130 is coupled to receive S change parameters 125, which may be stored in a non-volatile storage, for example. Based on the updated hue value, the original saturation and luma values and S change parameters 125, saturation manipulator 130 may generate an updated saturation value, i.e., $S_{new}$. Accordingly, as shown in FIG. 4, saturation manipulator 130 may output both the updated hue value and the updated saturation value to a corrector 140. As shown in FIG. 4, corrector 140 may further be coupled to receive the original luma value, as well as luma change parameters 135 which may be stored, for example, in a non-volatile storage. As described above, corrector 140 may adjust the original luma value if the resulting pixel data corresponding to the updated hue and saturation values and the original luma value would constitute an illegal color value. If the values received by corrector 140 indicate that the updated color data is a legal color, no correction is performed. If instead, it is determined that the updated color data is an illegal value, corrector 140 may adjust the luma value accordingly to obtain a legal color value. While described as correcting only the luma value, in other embodiments a combination of corrections to both the updated saturation value as well as the luma value may be performed and in still further embodiments corrections to the updated hue value, the updated saturation value and/or the original luma value may be performed.

As further shown in FIG. 4, the updated color data may be provided from corrector 140 to a converter 150, which may convert the color information back to the original or another desired color space. This converted pixel data may then be output to a desired location. For example, the updated pixel data may be stored in a memory or output directly to a display or other imaging device. While shown with this particular implementation in the embodiment of FIG. 4, the scope of the present invention is not so limited in this regard.

Embodiments may be implemented in an algorithm that can be executed in many different system types. For example, such systems can include digital imaging devices such as digital cameras, digital televisions, digital video devices and so forth. Similarly, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
  converting, in a converter of a hardware processor, pixel data from an input color space to a second color space to obtain a hue value, a saturation value and a luma value, the second color space corresponding to a luma, saturation and hue (LSH) color space;
  manipulating, in a first manipulator of the hardware processor, the hue value according to a first algorithm to obtain an updated hue value, wherein the first algorithm comprises adding a delta hue value to the hue value, wherein the delta hue value is a function of the hue value and the saturation value;

manipulating, in a second manipulator of the hardware processor, the saturation value according to a second algorithm to obtain an updated saturation value, wherein the updated saturation value is based on the updated hue value and the saturation value, wherein the second algorithm comprises adding the saturation value to an alpha value that controls a change to the saturation value based on the updated hue value and the saturation value, and wherein the alpha value determines a slope of the manipulation from the saturation value to the updated saturation value; and determining, in a corrector of the hardware processor, whether updated pixel data including the updated hue value and the updated saturation value is a desired value and storing the updated pixel data if so, otherwise adjusting at least one of the updated hue value, the updated saturation value, and the luma value to obtain desired updated pixel data and storing the desired updated pixel data.

2. The method of claim 1, including adjusting the luma value while maintaining the updated hue value and the updated saturation value.

3. The method of claim 1, wherein the updated hue value is based on the hue value and the saturation value.

4. The method of claim 1, further comprising converting the updated pixel data to the input, or any other, color space.

5. An apparatus comprising:
an image processor that converts pixel data from a first color space to a second color space to obtain a hue value, a saturation value and a luma value, manipulates the hue value to obtain an updated hue value, manipulates the saturation value to obtain an updated saturation value based on the updated hue value and the saturation value, and if updated pixel data including the updated hue value and the updated saturation value is an undesired value adjusts the luma value, wherein the image processor manipulates the saturation value by addition of the saturation value to an alpha value that controls a change to the saturation value based on the updated hue value and the saturation value, wherein the alpha value determines a slope of the manipulation from the saturation value to the updated saturation value; and
a memory coupled to the image processor.

6. The apparatus of claim 5, wherein the image processor comprises:

a first converter that converts the pixel data from the first color space to the second color space;
a first manipulator coupled to the first converter that manipulates the hue value;
a second manipulator coupled to the first manipulator that manipulates the saturation value; and
a corrector coupled to the second manipulator that corrects the luma value if the updated pixel data is an undesired value.

7. The apparatus of claim 6, further comprising a storage that stores a plurality of predetermined parameters for use by the first manipulator and the second manipulator.

8. The apparatus of claim 7, further comprising a second storage coupled to the image processor including instructions to enable the image processor to perform the hue manipulation and the saturation manipulation.

9. The apparatus of claim 6, further comprising a display coupled to the image processor to output the updated pixel data.

10. The apparatus of claim 6, wherein the image processor determines if the updated pixel data is a desired value.

11. The apparatus of claim 10, wherein the image processor converts the updated pixel data from the second color space to the first, or any other, color space.

12. An apparatus comprising:
a hardware processor that converts pixel data from a first color space to a second color space to obtain a hue value, a saturation value and a luma value, manipulates the hue value to obtain an updated hue value, and manipulates the saturation value to obtain an updated saturation value based on the updated hue value and the saturation value, wherein manipulation of the saturation value is via addition of the saturation value to an alpha value that controls a change to the saturation value based on the updated hue value and the saturation value, wherein the alpha value determines a slope of the manipulation from the saturation value to the updated saturation value.

13. The apparatus of claim 12, wherein the hardware processor comprises a first converter that converts the pixel data from the first color space to the second color space, a first manipulator coupled to the first converter that manipulates the hue value, a second manipulator coupled to the first manipulator that manipulates the saturation value, and a corrector coupled to the second manipulator that corrects the luma value if the updated pixel data including the updated hue value and the updated saturation value is an undesired value.

* * * * *